(12) United States Patent
McClure et al.

(10) Patent No.: US 7,810,094 B1
(45) Date of Patent: Oct. 5, 2010

(54) DISTRIBUTED TASK SCHEDULING FOR SYMMETRIC MULTIPROCESSING ENVIRONMENTS

(75) Inventors: Steven T. McClure, Northborough, MA (US); Steven R. Chalmer, Newton, MA (US); Brett D. Niver, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 1405 days.

(21) Appl. No.: 11/239,776

(22) Filed: Sep. 30, 2005

(51) Int. Cl.
*G06F 9/46* (2006.01)

(52) U.S. Cl. .................. 718/102; 718/100; 718/103; 718/104; 718/107; 718/108

(58) Field of Classification Search .......... 718/100, 718/102–104, 107–108
See application file for complete search history.

(56) References Cited

U.S. PATENT DOCUMENTS

| | | | |
|---|---|---|---|
| 5,826,081 A * | 10/1998 | Zolnowsky | 718/103 |
| 6,687,903 B1 | 2/2004 | Chalmer et al. | 718/100 |
| 6,728,962 B1 | 4/2004 | Chalmer et al. | 718/108 |
| 7,162,576 B2 * | 1/2007 | Mizuno et al. | 711/112 |
| 2005/0033889 A1 * | 2/2005 | Hass et al. | 710/260 |
| 2005/0149936 A1 * | 7/2005 | Pilkington | 718/102 |

* cited by examiner

*Primary Examiner*—Meng-Ai An
*Assistant Examiner*—Kenneth Tang
(74) *Attorney, Agent, or Firm*—BainwoodHuang

(57) ABSTRACT

A process scheduling method includes executing a plurality of symmetric schedulers on respective processors of a multi-processing system. Each scheduler periodically accesses a shared lock to obtain exclusive access to a shared scheduling data structure including (a) process information identifying the processes, and (b) scheduling information reflecting the executability and priorities of the processes. After obtaining the lock, each scheduler performs a scheduling routine including (a) utilizing the scheduling information and a scheduling algorithm to identify a next executable process, and (b) (1) activating the identified process to begin executing on the processor on which the scheduler is executing, and (2) updating the scheduling information to reflect the activation of the identified process. The scheduler then accesses the lock to relinquish exclusive access to the scheduling data structure. The fully symmetric scheduler provides for efficient, high-performance scheduling especially in embedded multiprocessing computer systems in which the rate of process context switches may be several thousand per second.

10 Claims, 4 Drawing Sheets

DISTRIBUTED TASK SCHEDULING FOR SYMMETRIC MULTIPROCESSING ENVIRONMENTS

BACKGROUND

The present invention is related to the field of task scheduling for multiprocessing computerized systems.

Many computerized systems are of the "multiprocessing" variety in which the processing workload of the system is distributed across two or more relatively independent processors. Modern semiconductors are sufficiently dense that multiple processor "cores", such as PowerPC® general-purpose processors, can be placed in a single integrated circuit and used in a variety of applications. As an example, multiple-processor complexes are utilized to perform a variety of functions in front-end and back-end interface modules of data storage systems such as those sold by EMC Corporation under the trademark Symmetrix®.

In computerized systems generally, the workload typically consists of a number of distinct "processes". In general-purpose computer systems, there may be processes for performing various system tasks such as handling network communications, memory management, etc, as well as processes that are associated with user applications (e.g., one or more processes that instantiate a database application or Web server). The process paradigm is also used in so-called embedded computerized systems used within larger systems having particular applications. The above-referenced processing complexes of a data storage system such as Symmetrix system are examples of embedded computerized systems.

Multiprocessing systems can be classified as either "symmetric" or "asymmetric" based on how the processing workload is distributed among the processors. In asymmetric multiprocessing systems, processes are generally assigned to certain processors only. Asymmetric multiprocessing approaches are commonly used in embedded computerized systems, in which it may be convenient to partition the overall workload into some small number of pieces and assign them to separate processors. In one example, interface modules of Symmetrix data storage systems have utilized one processor for communicating with external host computers that are clients of the storage system, and another processor for communicating with the back-end disk drives on which data is stored. In asymmetric multiprocessing systems, each processor is responsible for its own process scheduling. There is generally no need for scheduling at a higher (inter-processor) level because processes are constrained to be executed on particular processors.

In contrast to asymmetric multiprocessing systems, symmetric multiprocessing systems generally allow for processes to be executed on any processor. The processors can be seen as resources that are utilized as needed to carry out the overall processing workload of the system. Thus, in symmetric multiprocessing systems it is an aspect of the scheduler to consider the relative capabilities and loading of the processors, for example, in making scheduling decisions and assigning processes to processors.

In multiprocessing systems including symmetric multiprocessing systems, it is known to organize the scheduler in an asymmetric fashion as one master scheduler executing on one processor and a set of sub-schedulers executing on the other processors. In one configuration, the master scheduler communicates with and controls the operation of the sub-schedulers to carry out one coherent scheduling algorithm for the overall computerized system. Thus the respective operations of the master scheduler and sub-schedulers are synchronized sufficiently to enable such communication and control.

SUMMARY

When a scheduler is implemented in an asymmetric fashion as discussed above, it does not fully realize the performance and organizational benefits that can be obtained in a multiprocessing system. In fact, the scheduler may contribute to degraded system performance if the communication and control between the master scheduler and the sub-schedulers becomes a significant fraction of the scheduling workload, or if processors are rendered idle for significant periods to achieve the required synchronization among the master scheduler and the sub-schedulers.

To overcome these and other shortcomings of prior scheduling approaches in multiprocessing systems, methods and apparatus for process scheduling in a multiprocessing system are disclosed that are fully symmetric and therefore can be deployed in a flexible and efficient manner on a set of processors of the multiprocessing system.

The scheduling method includes executing a plurality of symmetric schedulers on respective processors of the multiprocessing system. Each scheduler periodically accesses a lock shared by the schedulers to obtain exclusive access to a scheduling data structure shared by the schedulers, the scheduling data structure including (a) process information identifying the processes to be scheduled, and (b) scheduling information reflecting the executability and relative priorities of the processes. Upon obtaining such exclusive access to the scheduling data structure, each scheduler performs a scheduling routine including (a) utilizing the scheduling information and a predetermined scheduling algorithm to identify a next executable one of the processes, if any, and (b) upon identifying such a next executable one of the processes, (1) activating the identified process to begin executing on the processor on which the scheduler is executing, and (2) updating the scheduling information to reflect the activation of the identified process. Upon completing the scheduling routine, each scheduler accesses the lock to relinquish exclusive access to the scheduling data structure.

Due to the fully symmetric nature of the scheduling technique, the synchronization among the schedulers on the different processors is generally limited to accessing the shared data structure. Especially when a simple scheduling algorithm such as round-robin is employed, the scheduling routine can be executed very quickly, and thus scheduling is accomplished very efficiently. This approach is especially beneficial in embedded multiprocessing computer systems in which the rate of process context switches may be several thousand per second.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
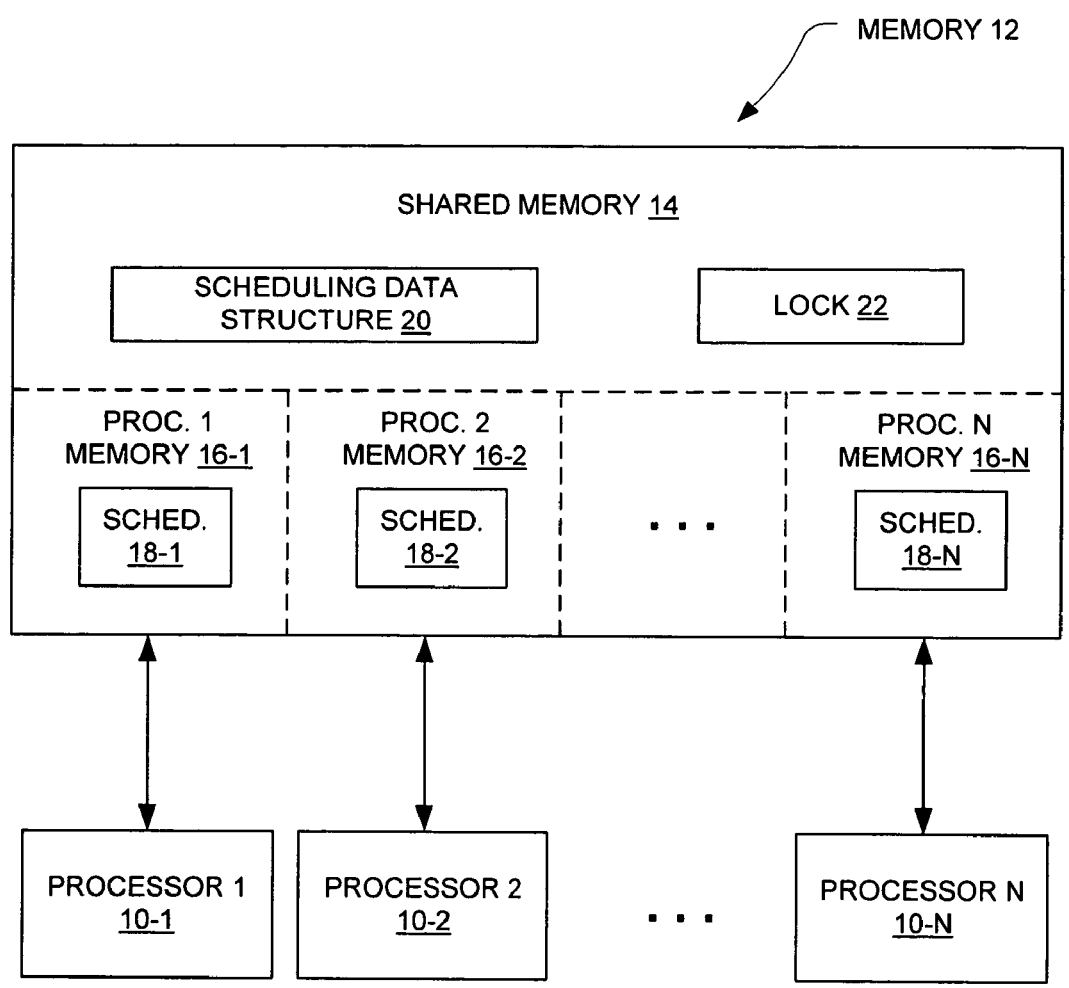
FIG. 1 is a block diagram of a processor complex of a multiprocessing system in accordance with the present invention.

FIG. 1 shows a processor complex of a symmetric multi-processing (SMP) system. SMP systems in general have wide application, such as in high-performance general-purpose or special-purpose computing systems and complex embedded computing systems. Below is described one particular type of SMP system, which is a hardware interface module of a data storage system.

The processor complex of FIG. 1 includes a plurality of processors 10 (e.g., 10-1, 10-2, . . . , 10-N as shown) coupled to memory 12. The memory 12 includes shared memory 14 which is accessible by all the processors 10, as well as a plurality of private memories 16 (e.g. 16-1, 16-2, . . . , 16-N as shown) each accessible to only a corresponding processor. The memory 12 may be implemented in a variety of fashions. It may be convenient, for example, to utilize a single physical memory structure with logical (e.g., address-based) partitions to define the shared memory 14 and individual memories 16 as respective memory regions. Alternatively, it may be desirable in some embodiments to utilize separate physical memory structures for each of the private memories 16 as well as the shared memory 14.

Generally, an SMP system utilizes the individual processors 10 as resources that can be assigned to perform processing for a single set of tasks or processes defined in the system. In other words, there is one instance of an operating system defined in the multiprocessing system, along with one set of processes that are to be executed by the multiprocessing system. These processes are executed by the processors 10 in a dynamic fashion. Theoretically, at any given time any of the processes might be executing on any of the processors 10. In some systems, there may be mechanisms in place that restrict which processes can run on which processors 10 for any of a variety of reasons. However, in the most general sense SMP involves treating the processors 10 as a pool of resources that can be freely assigned as necessary to the set of processes that are active in the system.

The SMP system employs a software task called a "scheduler" as part of the operating system to coherently assign processing tasks among the processors 10. In the arrangement of FIG. 1, the scheduler is realized as a set of distributed identical or "symmetric" schedulers 18 (e.g. 18-1, 18-2, . . . , 18-N as shown). Each scheduler 18 is executed by, and performs scheduling for, the corresponding processor 10, i.e., scheduler 18-1 is executed by processor 10-1, scheduler 18-2 by processor 10-2, etc. Each scheduler 18 has access to a scheduling data structure 20 and a lock 22 residing in the shared memory 14. The structure and use of the scheduling data structure 20 are described below. The lock 22 is usually a simple binary variable on which an atomic "test and set" operation can be performed, as known in the art. Each scheduler 18 includes routines for accessing the lock 22 to either "set" or "clear" it. When a scheduler 18 successfully sets the lock 22, that scheduler 18 obtains exclusive access to the scheduling data structure 20 (i.e., exclusive of the other schedulers 18). When a scheduler 18 clears the lock 22, it has relinquished such exclusive access such that another scheduler 18 can thereafter obtain exclusive access by setting the lock 22.

There are a variety of mechanisms by which the lock 22 can be controlled and used. For purposes of the present description, it is assumed that a so-called "spin lock" technique is utilized in which a scheduler 18, upon finding the lock 22 set by another scheduler 18 at a time it is attempting to set the lock 22, simply loops until the other scheduler 18 clears the lock 22, at which time the looping (or spinning) scheduler 18 can successfully set the lock 22. Other lock methods may also be used. With spin locks and other lock mechanisms, it is necessary to incorporate some type of starvation-avoidance technique to ensure that no scheduler 18 will be systematically prevented from setting the lock 22 for any significant period of time. Such starvation-avoidance techniques are generally known in the art.

Figure 2:
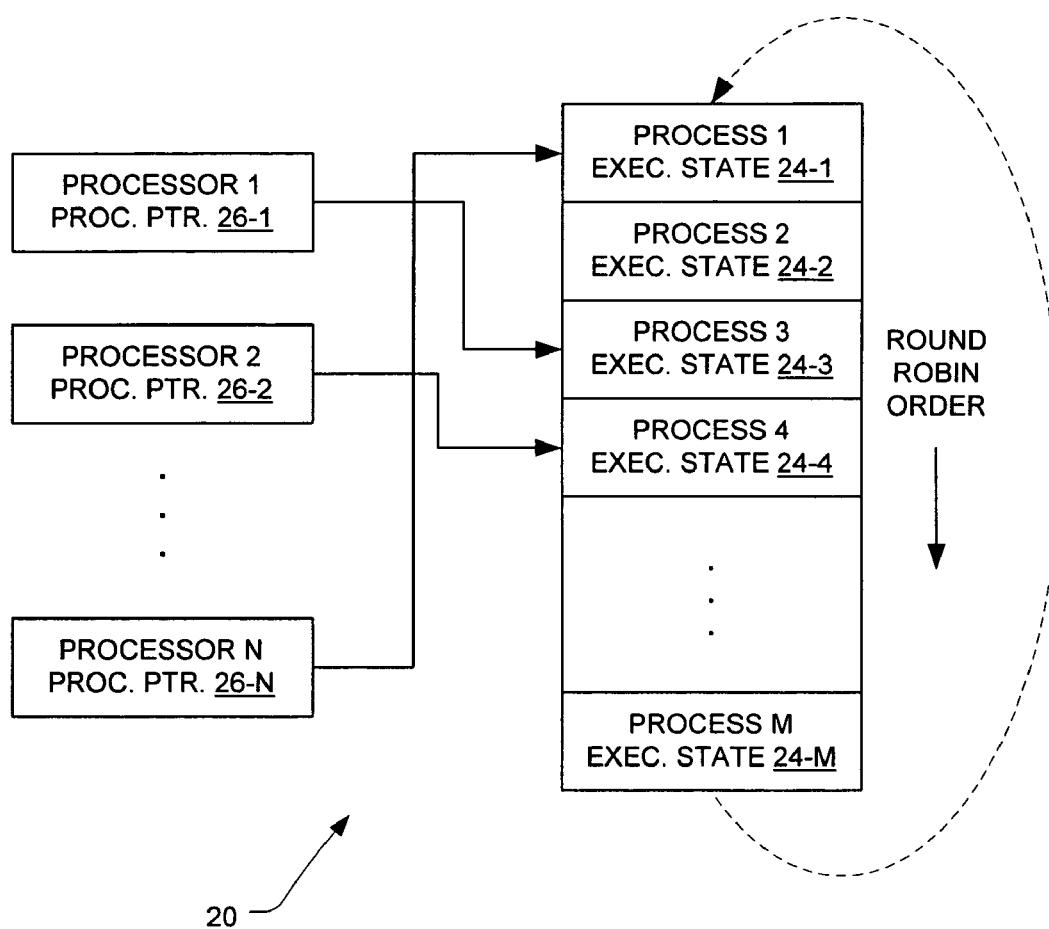
FIG. 2 is a diagram showing the contents and structure of a scheduling data structure in the processor complex of FIG. 1.

FIG. 2 shows the contents and structure of the scheduling data structure 20. For each process that is active in the SMP system, there is corresponding process execution state information 24 (e.g., 24-1, 24-2, . . . , 24-M as shown, where M is the number of active processes). In the illustrated embodiment, the collection of per-process state information 24 is organized as a circular array to facilitate "round robin" scheduling, as described below. The set of possible process execution states is generally a function of the type of operating system and the processor architecture. In one embodiment particularly suitable for embedded systems, the PowerPC® processor architecture may be employed. For purposes of the present description, three potential process states are of interest, and these are referred to herein as follows:

(1) Executing—currently executing on a processor (2) Executable—not currently executing, but ready to be executed (3) Not Executable—not ready to be executed The "Executing" state means that the process is already executing on another processor 16. The "Executable" state occurs, for example, when an input/output operation or similar blocking event has been completed but the blocked process has not yet been selected for execution by a processor 10. The "Not Executable" state can occur, for example, when a process is blocked waiting for an input/output or other operation to complete. The schedulers 18 ignore any processes in the Executing state and any in the Not Executable state for purposes of selecting a process to be executed next. When activated, each scheduler 18 chooses from among the Executable processes to identify a process to be executed on the corresponding process 10, whereupon the selected process enters the Executing state.

The scheduling data structure 20 also includes a plurality of process pointers 26 (e.g., 26-1, 26-2, . . . , 26-N as shown), one for each processor 10. Each pointer 26 indicates which process was most recently scheduled for execution on the corresponding processor 10. In the situation illustrated in FIG. 2, for example, the mapping of processes to processors 10 is as follows:

| Processor | Process |
|---|---|
| 1 | 3 |
| 2 | 4 |
| N | 1 |

During each scheduling activity as described below, a given scheduler 18 will generally change its process pointer 26 to point to a new process that has been selected for execution on the corresponding processor 10. Thus the primary purpose of the process pointers 26 is to indicate which processes are being executed by which processors 10.

As mentioned above, in one embodiment so-called "round robin" scheduling is utilized. According to this scheduling algorithm, the processes are ordered in a circular fashion and selected for execution according to the ordering. At any given scheduling opportunity (across all the schedulers 18), the highest priority process for execution is the process immediately following the process that was most recently selected for execution, and each successive process has a successively lower priority. Thus, a given scheduler 18 looks forward from the current process pointed to by its process pointer 26 to find the next executable process. In alternative embodiments, other scheduling algorithms may be employed, including for example so-called "weighted round robin" scheduling as well as other more complex algorithms.

It should be noted that the symmetric scheduling approach described herein may be particularly synergistic with relatively simple scheduling algorithms (such as round robin) in systems having relatively few active processes and relatively high context switching rates. The general idea of symmetric distributed scheduling is that each processor 10 operates as independently as possible, including the manner in which it assigns processing tasks to itself. In larger-scale systems such as large servers with potentially thousands of process threads, complex scheduling criteria, and a relatively heavy workload per scheduling interval (e.g., thousands of machine cycles per scheduling interval), it may be necessary to employ a complex scheduling system that may not be easily or efficiently decomposed into pieces that can be distributed in a symmetric manner among a set of processors. Rather, the scheduling system may be implemented in a more asymmetric fashion that requires some or all processors to synchronize with each other when scheduling occurs, creating a potential performance bottleneck. As long as the scheduling interval is relatively long, as it generally is in such systems, the magnitude of the performance degradation from such asymmetric scheduling may not be significant. In contrast, in systems having fewer processing threads (e.g., tens of threads or processes) and much higher context switch rates (e.g., $10^3$ to $10^6$ context switches per second), it is beneficial to use a simpler, computationally efficient scheduling algorithm and distribute it in a fully symmetric fashion among a set of independent schedulers such as schedulers 18.

Figure 3:
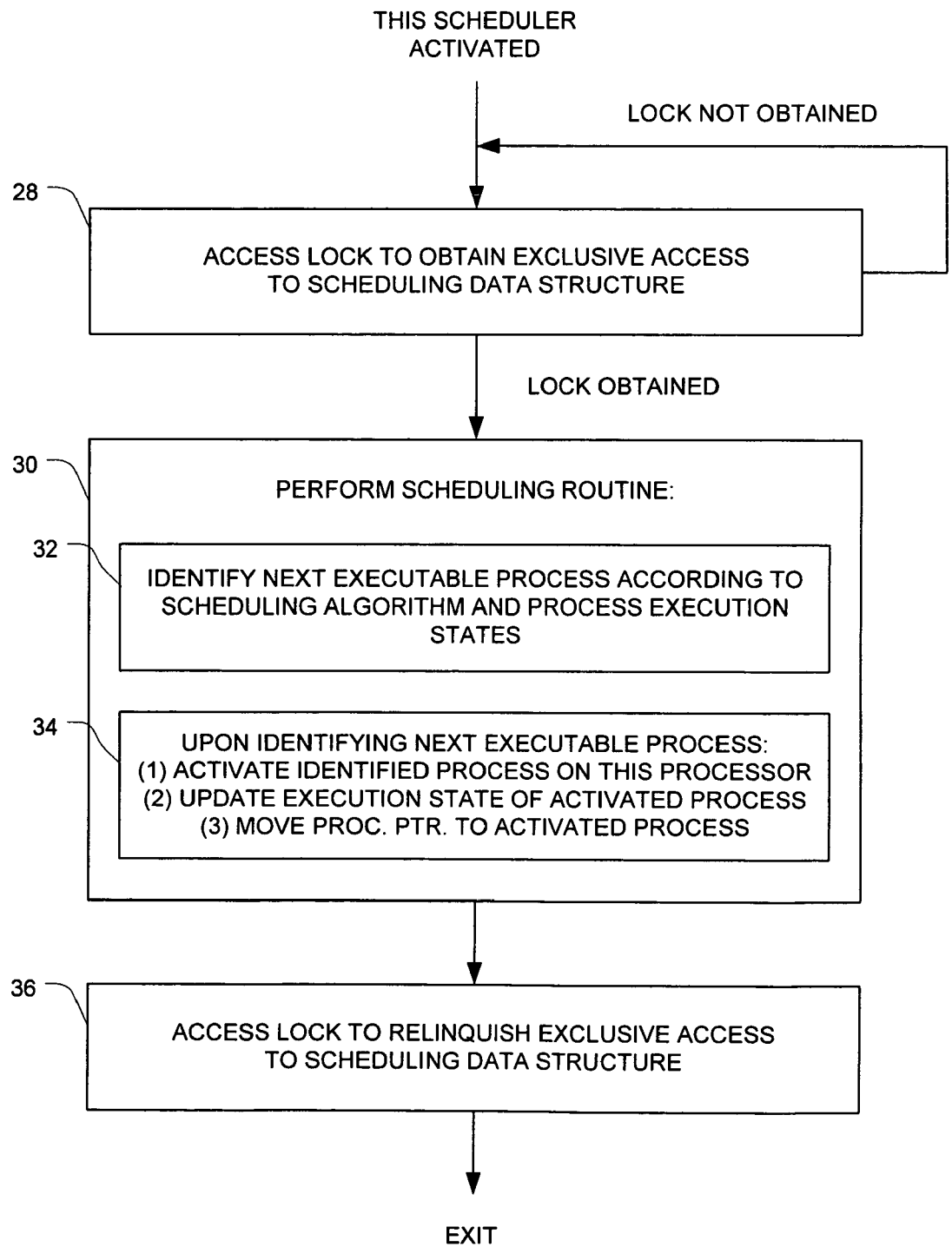
FIG. 3 is a flow diagram of the operation of a symmetric scheduler operating in a processor of the processor complex of FIG. 1.

FIG. 3 shows the process performed by each scheduler 18 at regular intervals. It will be appreciated that on each processor 10 the respective scheduler 18 itself must be "scheduled", i.e., activated to run. Although a scheduler 18 may be activated in any of a variety of ways, in one embodiment the scheduler 18 is configured as the default process on the respective processor 10. Whenever an executing process is suspended, either by the expiration of its quantum (preemption) or by yielding the remainder of its quantum in some fashion, the scheduler 18 is activated in order to select the next process to receive use of the processor 10.

Upon activation, at step 28 the scheduler 18 accesses the lock 22 to obtain exclusive access to the scheduling data structure 20. As described above, this process involves an atomic operation for testing and conditionally setting the lock 22. If the scheduler 18 does not obtain the lock 22, then it "spins", i.e., repeats step 28 in a loop until it either obtains the lock 22 or some other event (not shown) forces it from the loop.

When the scheduler 18 obtains the lock 22, it proceeds to perform a scheduling routine as shown in step 30. The scheduling routine includes steps 32 and 34 as shown. In step 32, the scheduler 18 identifies the next executable process according to the scheduling algorithm and the process execution states 24. In the case of a round-robin algorithm, the scheduler 18 looks for the next sequential process in the ordered circle that is in an Executable state. A an example based on the situation shown in FIG. 2, the scheduler 18-1 of processor 1 looks forward from process 3. Process 4 has already been assigned to processor 10-2 as indicated by the value of the process 2 process pointer 26-2. The scheduler 18-1 thus continues searching in the order of (5, 6, . . . , M, 1, 2, 3) for the first process having an Executable state.

Referring again to FIG. 3, in step 34, upon identifying a next executable process, the scheduler 18 does the following:
(1) Activate the identified process (i.e., make it the executing process on the respective processor 10).
(2) Update the execution state 24 of the activated process to indicate that it is now Executing; and
(3) Move the respective process pointer 26 (e.g., pointer 26-1 for scheduler 18-1, etc.) to point to the activated process Upon completing the scheduling routine of step 30, the scheduler 18 at step 36 accesses the lock 22 to relinquish exclusive access to the scheduling data structure 22, to enable another scheduler 18 of another processor 10 to perform its scheduling routine. Each of the schedulers 18 performs the process shown in FIG. 3. It will be appreciated that whenever the lock 22 has been obtained by one of the schedulers 18, any other schedulers 18 that perform their instance of step 28 will spin until the lock 22 is released, at which point one of the spinning schedulers 18 will obtain the lock 22 and proceed to its instance of step 30. As previously mentioned, the spin lock mechanism of the SMP system should provide fair access to the lock 22 by all the schedulers 18 such that no scheduler 18 is "starved", i.e., prevented from executing the scheduling routine of step 30 for an excessively long period.

Figure 4:
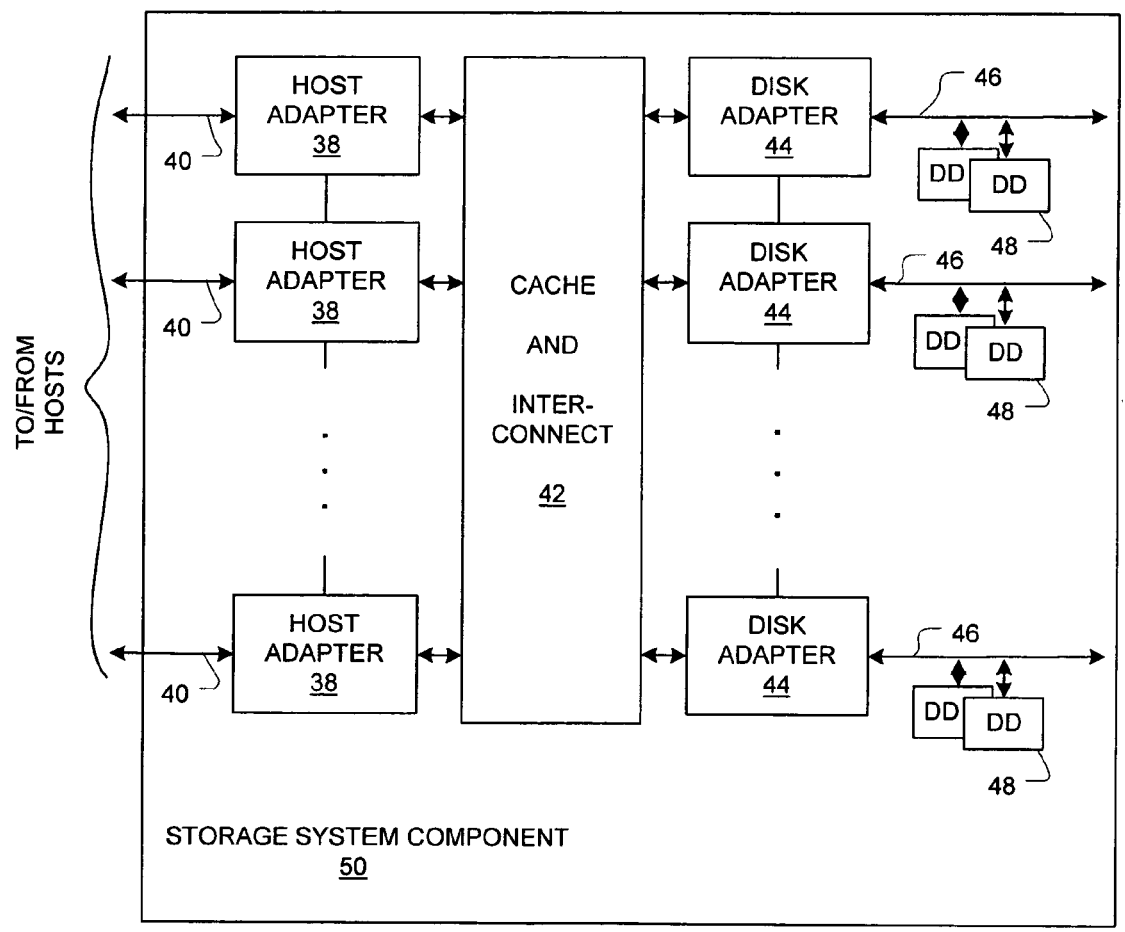
FIG. 4 is a block diagram of a storage system in which the processor complex of FIG. 1 may be used.

FIG. 4 shows an exemplary application for an SMP processor complex such as shown in FIG. 1 and the symmetric scheduling technique disclosed herein. The application is a data storage system for storing data for a number of host computers (or simply hosts). The host computers are coupled to respective host adapters 38 of the data storage system via respective interconnect buses 40, such as Fiber Channel or other high-speed storage interconnect buses. The host adapters 38 are coupled to cache and interconnect block 42, which in turn is coupled to disk adapters 44. Each disk adapter 44 interfaces to one or more storage buses 46 to which a plurality of disk drives (DD) 48 are connected. The storage buses 46 may be Fiber Channel or Small Computer System Interconnect (SCSI) buses for example. In the illustrated example, these components are part of a storage system component 50 that may include a distinct physical housing. An example of such a storage system component is a Symmetrix® storage system sold by EMC Corporation.

The processor complex of FIG. 1 may be utilized, for example, in each of the host adapters 38 and disk adapters 44. Within each type of adapter 38 and 44, a set of processes is executed that carry out pertinent operations. Within the host adapters 38, for example, there may be distinct processes that supervise the transfer of data between the respective hosts and the cache and interconnect block 42, and other processes that perform various kinds of background functions, such as link light level monitoring, inter-board messaging, environmental monitoring, etc. Similarly, there may be processes in the disk adapters 44 for functions such as global memory cache integrity testing, disk drive monitoring, inter-board messaging, etc.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of scheduling a set of processes in a multiprocessing system, the method comprising executing a plurality of symmetric schedulers on respective processors of the multiprocessing system, wherein each scheduler performs the steps of:
   (i) periodically accessing a lock shared by the schedulers to obtain exclusive access to a scheduling data structure shared by the schedulers, the scheduling data structure including (a) process information identifying the processes to be scheduled, and (b) scheduling information reflecting the executability and relative priorities of the processes;
   (ii) only upon obtaining such exclusive access to the scheduling data structure, performing a scheduling routine including:
      (a) utilizing the scheduling information and a predetermined round-robin scheduling algorithm to identify a next executable one of the processes, if any; and
      (b) upon identifying such a next executable one of the processes, (1) activating the identified process to begin executing on the processor on which the scheduler is executing, and (2) updating the scheduling information to reflect the activation of the identified process, wherein updating the scheduling information includes changing the value of a process pointer associated with the processor on which the scheduler is executing to point to the activated process; and
   (iii) upon completing the scheduling routine, accessing the lock to relinquish exclusive access to the scheduling data structure.

2. A method according to claim 1, wherein the round-robin scheduling algorithm is a weighted round-robin scheduling algorithm.

3. A method according to claim 1, wherein accessing the lock to obtain exclusive access to the scheduling data structure comprises spinning until the lock is received indicating that such exclusive access to the scheduling data structure has been obtained.

4. A method according to claim 1, wherein each scheduler is a default process of the respective processor such that the scheduler is activated upon the suspension of execution of an executing one of the set of processes.

5. A method according to claim 1, wherein the multiprocessing system is a multi-processor interface module of a data storage system, the interface module providing an interface between an internal cache and interconnection block of the data storage system and one of (a) a host computer for which the data storage system stores data, and (b) a disk drive on which the data for the host computer is stored.

6. A multiprocessing system, comprising:
   a plurality of processors; and
   memory coupled to the processors, the memory including shared memory accessible by all of the processors and a plurality of private memories each accessible to only a corresponding one of the processors, the private memories being operative to store a plurality of symmetric schedulers each being executable on a corresponding processor of the multiprocessing system, wherein each processor is operative when executing the corresponding scheduler to perform the steps of:
   (i) periodically accessing a lock in the shared memory to obtain exclusive access to a scheduling data structure in the shared memory, the scheduling data structure including (a) process information identifying the processes to be scheduled, and (b) scheduling information reflecting the executability and relative priorities of the processes;
   (ii) only upon obtaining such exclusive access to the scheduling data structure, performing a scheduling routine including:
      (a) utilizing the scheduling information and a predetermined round-robin scheduling algorithm to identify a next executable one of the processes, if any; and
      (b) upon identifying such a next executable one of the processes, (1) activating the identified process to begin executing on the processor on which the scheduler is executing, and (2) updating the scheduling information to reflect the activation of the identified process, wherein updating the scheduling information includes changing the value of a process pointer associated with the processor on which the scheduler is executing to point to the activated process; and
   (iii) upon completing the scheduling routine, accessing the lock to relinquish exclusive access to the scheduling data structure.

7. A multiprocessing system according to claim 6, wherein the round-robin scheduling algorithm is a weighted round-robin scheduling algorithm.

8. A multiprocessing system according to claim 6, wherein accessing the lock to obtain exclusive access to the scheduling data structure comprises spinning until the lock is received indicating that such exclusive access to the scheduling data structure has been obtained.

9. A multiprocessing system according to claim 6, wherein each scheduler is a default process of the respective processor such that the scheduler is activated upon the suspension of execution of an executing one of the set of processes.

10. A multiprocessing system according to claim 6, wherein the multiprocessing system is a multi-processor interface module of a data storage system, the interface module providing an interface between an internal cache and interconnection block of the data storage system and one of (a) a host computer for which the data storage system stores data, and (b) a disk drive on which the data for the host computer is stored.

* * * * *